(12) United States Patent
Carrion Gomez et al.

(10) Patent No.: US 12,715,813 B2
(45) Date of Patent: Aug. 25, 2026

(54) DRY CEMENTITIOUS MATERIAL MIXTURE FOR 3D-PRINTING

(71) Applicant: HOLCIM TECHNOLOGY LTD, Zug (CH)

(72) Inventors: Benito Carrion Gomez, Holderbank (CH); Hélène Lombois-Burger, Holderbank (CH); Qing Zhang, Holderbank (CH); Sylvain Duchand, Holderbank (CH); Abdelaziz Labyad, Holderbank (CH)

(73) Assignee: HOLCIM TECHNOLOGY LTD, Zug (CH)

( * ) Notice: Subject to any disclaimer, the term of this patent is extended or adjusted under 35 U.S.C. 154(b) by 661 days.

(21) Appl. No.: 17/914,090

(22) PCT Filed: Mar. 25, 2021

(86) PCT No.: PCT/IB2021/052489
§ 371 (c)(1),
(2) Date: Sep. 23, 2022

(87) PCT Pub. No.: WO2021/191839
PCT Pub. Date: Sep. 30, 2021

(65) Prior Publication Data

US 2023/0150877 A1 May 18, 2023

(30) Foreign Application Priority Data

Mar. 26, 2020 (EP) .................................... 20290033

(51) Int. Cl.
*C04B 28/04* (2006.01)
*B33Y 70/00* (2020.01)
(Continued)

(52) U.S. Cl.
CPC ............. *C04B 28/04* (2013.01); *B33Y 80/00* (2014.12); *C04B 7/02* (2013.01); *C04B 20/0048* (2013.01);
(Continued)

(58) Field of Classification Search
CPC ....... C04B 28/04; C04B 7/02; C04B 20/0048; C04B 22/10; C04B 24/04; C04B 2103/10;
(Continued)

(56) References Cited

FOREIGN PATENT DOCUMENTS

CN 106064911 A 11/2016
CN 107311561 A * 11/2017 ............. C04B 28/04
(Continued)

OTHER PUBLICATIONS

EP_3431172_A1_Machine_Translation (Year: 2019).*
(Continued)

*Primary Examiner* — Amber R Orlando
*Assistant Examiner* — Anastasia A. Kuvayskaya
(74) *Attorney, Agent, or Firm* — CUSHMAN PARTNERS, LLC

(57) ABSTRACT

A dry cementitious material mixture for 3D-printing, includes a hydraulic cement, at least one viscosity enhancing admixture, at least one accelerator and aggregates, wherein the at least one viscosity enhancing admixture is present in an amount of 0.05-1.5% by weight based on the hydraulic cement and the at least one accelerator is present in an amount of 0.5-6.0% by weight based on the hydraulic cement.

19 Claims, 7 Drawing Sheets

(51) Int. Cl.

| | |
|---|---|
| ***B33Y 80/00*** | (2015.01) |
| ***C04B 7/02*** | (2006.01) |
| ***C04B 20/00*** | (2006.01) |
| ***C04B 22/10*** | (2006.01) |
| ***C04B 24/04*** | (2006.01) |
| *C04B 103/10* | (2006.01) |
| *C04B 103/22* | (2006.01) |
| *C04B 103/32* | (2006.01) |
| *C04B 103/44* | (2006.01) |
| *C04B 111/00* | (2006.01) |

(52) U.S. Cl.
CPC .............. *C04B 22/10* (2013.01); *C04B 24/04* (2013.01); *B33Y 70/00* (2014.12); *C04B 2103/10* (2013.01); *C04B 2103/22* (2013.01); *C04B 2103/32* (2013.01); *C04B 2103/44* (2013.01); *C04B 2111/00181* (2013.01)

(58) Field of Classification Search
CPC ............ C04B 2103/22; C04B 2103/32; C04B 2103/44; C04B 2111/00181; C04B 28/02; C04B 28/06; C04B 28/14; B33Y 70/00; B33Y 80/00; Y02W 30/91
See application file for complete search history.

(56) References Cited

FOREIGN PATENT DOCUMENTS

| | | | | |
|---|---|---|---|---|
| CN | 109650825 A | | 4/2019 | |
| DE | 20304239 U1 | | 5/2003 | |
| EP | 3431172 A1 | * | 1/2019 | .......... B01F 25/3141 |
| EP | 3756844 A1 | | 12/2020 | |
| EP | 3756845 A1 | | 12/2020 | |
| WO | WO 2017/149040 A1 | | 9/2017 | |
| WO | WO 2017/221058 A1 | | 12/2017 | |
| WO | WO 2018/083010 A1 | | 5/2018 | |
| WO | WO-2019089771 A1 | * | 5/2019 | ............ B33Y 80/00 |
| WO | 2020016768 A1 | | 1/2020 | |
| WO | 2020021202 A1 | | 1/2020 | |
| WO | 2020187742 A1 | | 9/2020 | |

OTHER PUBLICATIONS

CN 107311561_Machine Translation (Year: 2017).*
International Search Report as issued in International Patent Application No. PCT/IB2021/052489, dated Jun. 25, 2021.
Chen, M., et al., "Rheological and mechanical properties of admixtures modified. 3D printing sulphoaluminate cementitious materials," Construction and Building Materials, vol. 189, Sep. 2018, XP085509882, pp. 601-611.
Ma, Guowei et al.: "A novel additive mortar leveraging internal curing for enhancing interlayer bonding of cementitious composite for 3D printing", Construction and Building Materials, vol. 244, 118305, Feb. 8, 2020 (Year: 2020)—(14 pages).
V. G. Papadakis et al.: "An AFM-SEM investigation of the effect of silica fume and fly ash on cement paste microstructure", Journal of Materials Science 34 (1999) age 683-690 (Year: 1999)—(8 pages).
McCarthy et al.: "Chapter 9.2.2.1 Fly Ash" In: "Lea's Chemistry of Cement and Concrete", Dec. 31, 2019 (Dec. 31, 2019), Butterworth Heinemann, Oxford Cambridge, XP055905861, ISBN: 978-0-08-100773-0, pp. 369-370 (Year: 2019)—(2 pages).
McCarthy, M. J., et al., "9.2.2.3 Silica Fume" In: "Lea's Chemistry of Cement and Concrete," Dec. 2019, XP055905864, ISBN: 978-0-08-100773-0, p. 371—(1 page).
Omya Construction: "Betoflow D Innovative Fine Ground Calcium Carbonate for Dry Mortar and Concrete Applications," May 2021, XP055905688, Retrieved from the Internet: URL:https://www.omya.com/Documents/CON%20 icrosites/CON_FLY_Betof1ow_D_EN.pdf, [retrieved on Mar. 28, 2022], 4 pages.—(4 pages).
Chen, Y., et al., "Effect of different grade levels of calcined clays on fresh and hardened properties of ternary-blended cementitious materials for 3D printing", Cement and Concrete Composites, vol. 114, Jul. 2020, XP086292896 (20 pages).
Afnor; "Cement—Part 1: Composition, specifications and conformity criteria for common cements"; European Standard NF EN 197-1; Apr. 2012 (42 pages).
LOTTE Fine Chemical ; "Mecellose"; Product Information (31 pages).
Poraver by Dennert; The Functional Lightweght Aggregate From Post-Consumer Recycled Glass, Jan. 2015 (28 pages).
MOMENTIVE: Building & Construction "Axilat HP 8510 Best in Class for Air Quality" (4 pages).
G-Biosciences; Safety Data Sheet, Cellulose, Laboratory Grade, 25 g, according to Federal Register, vol. 77, No. 58, Jun. 28, 2019 (10 pages).
Grimm Metallpulver; Expandit Optonit, Innovative & functional, "Aluminium Powders and Pastes for dry-mix mortars and aerated concrete" (12 pages).
BYK Additives & Instruments; OPTIBENT-987 "Powdered rheology additive based on an activated, natural phyllosilicate for aqueous, mineral-based dry mix mortars and past-like binder systems" Jul. 2016 (2 pages).
Cimsil A55G; "Rheological low dust dolid additive designed for mortars and concrete", Tolsa Group (1 page).
Newchem; Denka SC-1 "Accelerator for fast setting and fast hardening cement based products", (2 pages).
LafargeHolcim; Steering Committee Morteros 3DCONS "Solutions for 3D Printing in Precast and Facades—Cementitious Mortars—Hydraulic Lime Mortars", Dec. 17, 2018 (33 pages).

* cited by examiner

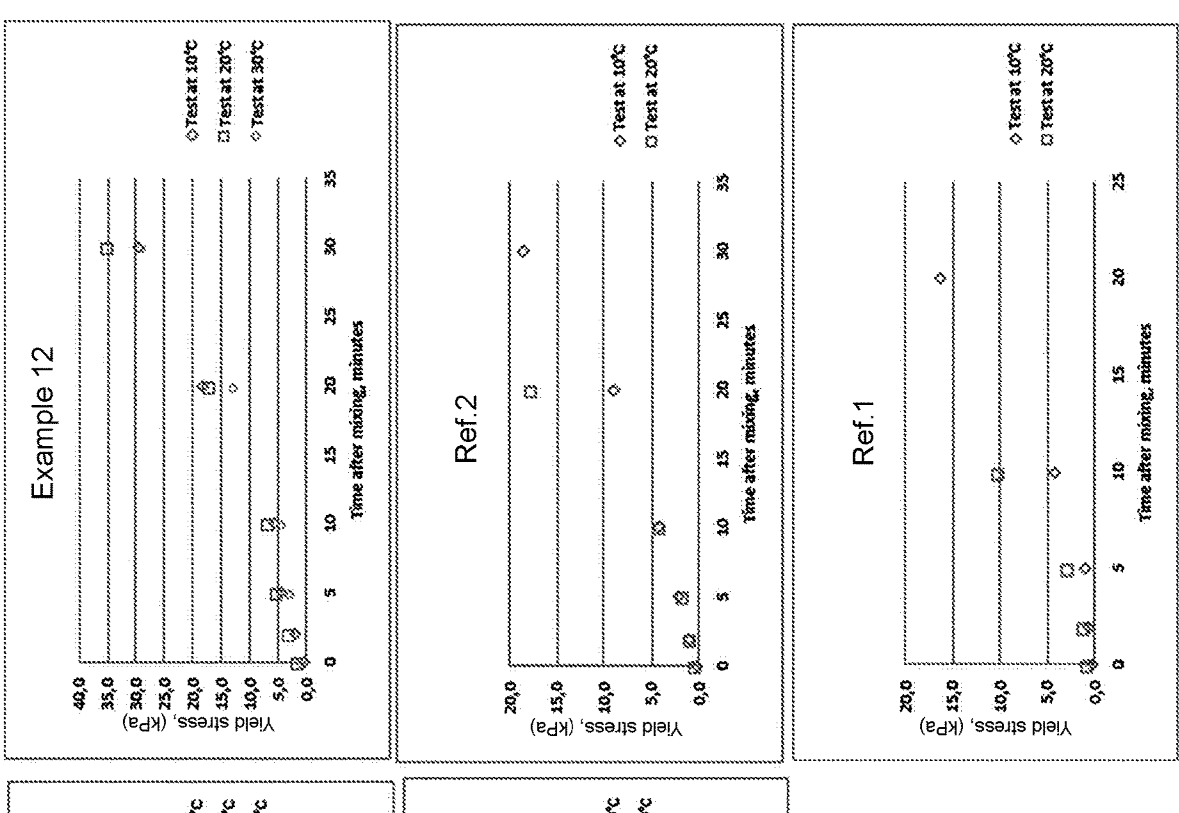
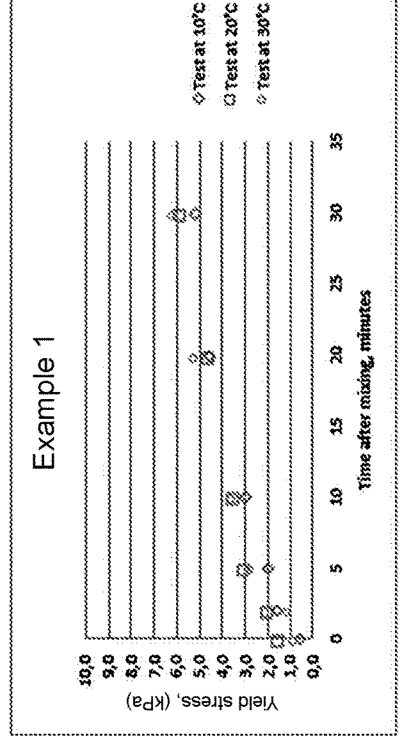
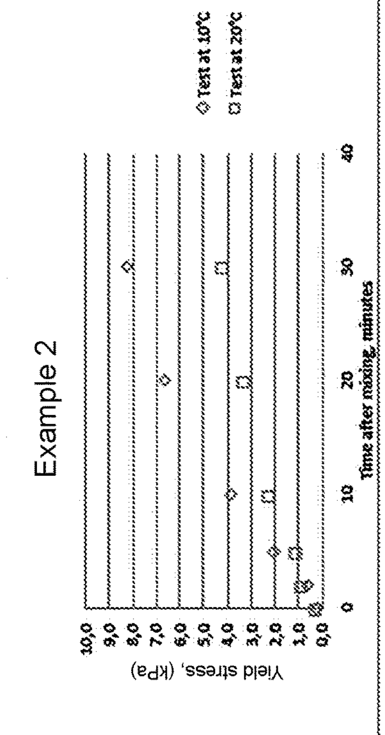
Fig. 9 a-e

DRY CEMENTITIOUS MATERIAL MIXTURE FOR 3D-PRINTING

CROSS-REFERENCE TO RELATED APPLICATIONS

This application is the U.S. National Stage of International Application Serial No. PCT/IB2021/052489, filed Mar. 25, 2021, which in turn claims priority to European Application No. 20 290 033.8, filed Mar. 26, 2020. The contents of all of these applications are incorporated herein by reference in their entirety.

The invention refers to a dry cementitious material mixture for 3D-printing.

Further, the invention refers to a method of placing a flowable construction material for building structural components layer-by-layer, such as for 3D printing, and the use of a dry cementitious material mixture for 3D-concrete-printing.

3D printing is a building technique that is commonly called "additive manufacturing" and consists of joining material to produce objects, layer upon layer, from 3D model data or another electronic data source. In particular, successive layers of material are formed under computer control by means of an industrial robot. It has already been proposed to develop 3D printers capable of producing structural buildings from a construction material that can be a mortar or a concrete. According to these proposals, the construction material is extruded through a nozzle to build structural components layer-by-layer without the use of formwork or any subsequent vibration. The possibility to build structures without formwork is a major advantage in terms of production rate, architectural freedom and cost reduction.

Usually, 3D printing of construction materials is a continuous process that comprises conveying fresh concrete, mortar or micro-mortar to a deposition head and placing the construction material through an outlet of the deposition head in order to form a layer of concrete. While placing the concrete, the mortar or the micro-mortar, the deposition head is moved under computer control in order to create a layer of construction material in accordance with the underlying 3D model. In particular, the deposition head places a ribbon of fresh concrete or mortar material. For allowing the fresh concrete or mortar to be moved smoothly through each part of the delivery process to the deposition head, a consistent rheology of the fresh material must be safeguarded.

However, the construction material must not only be sufficiently fluid for conveying and extrusion purposes, but also sufficiently firm in order to provide the required mechanical stability of the 3D printed structure before the hydraulic binder sets. In particular, the lower layers of the construction material should sustain the load imposed by upper layers without collapsing or deforming.

Therefore, a flowable construction material adapted for 3D printing typically contains a considerable amount of a hydraulic binder that has a short initial setting time, such as an aluminate cement. However, a binder having a short initial setting time will increase the risk that material builds up in the mixing devices, pumps, and in the printing head.

Another aspect to be considered is the printing speed. A high printing speed is needed for reducing construction time and to ensure an adequate interlayer adhesion. This is in some cases achieved by using a hydraulic binder that has a short initial setting time, as the deposed material will harden quickly and be able to support the layers that are subsequently deposited.

3D printed elements also require a strong bonding strength between the deposited layers, to ensure an adequate overall strength of the 3D printed structure. For this purpose, it is beneficial to place a layer while the preceding layer is still fresh. However, with a hydraulic binder having a short initial setting time the operational flexibility is very limited.

From the point of view of operational flexibility it would be desirable to have a flowable construction material that has a long initial setting time, i.e. a constant consistency that does not increase too much with time, because this would allow to have more time for adjustments of the printing process, such as for changing printing parameters during the construction.

To accommodate some of the above requirements, it has been proposed to add various admixtures to the flowable construction material in the deposition head immediately before the material is placed through an outlet of the deposition head. This allows to separately optimize the material characteristics for the process of pumping the material to the deposition head and for the process of placing the material layer by layer. In particular, the construction material can be designed to have a low plastic viscosity and a low yield stress for a good pumpability, and is adjusted to obtain the material properties that are desired for the placing process by adding a suitable admixture in the deposition head.

For example, WO 2017/221058 A1 discloses adding a rheology modifying agent to the flowable construction material in the deposition head so as to increase the yield stress.

WO 2017/149040 A1 discloses a system, wherein a setting accelerator is added to the material in the deposition head so that the material sets quickly once having been placed. WO 2018/083010 A1 discloses a multi-component mortar system based on an aluminous cement mixed with at least one set inhibitor so that mortar may be stored in its fresh state for several days or weeks, wherein an initiator system is added to the mortar in the deposition head immediately before being placed, in order to de-block the effect of the inhibitor.

However, adding an admixture to the material in the deposition head involves several disadvantages, such as related to the need to control the admixing process including accurately controlling the dosage of the admixture, and related to the complex additional equipment needed on the deposition head, which increases the weight and thus the maneuverability as well as the costs of the deposition head.

Therefore, the instant invention aims at improving a printable hydraulic construction material so as to overcome the above-mentioned problems.

In order to solve this object, the invention according to a first aspect thereof provides a dry cementitious material mixture for 3D-printing, comprising a hydraulic cement, at least one viscosity enhancing admixture, at least one accelerator and aggregates, wherein the at least one viscosity enhancing admixture is present in an amount of 0.05-1.5% by weight, preferably 0.2-0.6% by weight, based on the hydraulic cement and the at least one setting accelerator is present in an amount of 0.5-6.0% by weight, preferably 1.5-4.0% by weight, based on the hydraulic cement.

Thus, the invention provides a dry mix that contains all the ingredients and admixtures that are needed for obtaining a fresh mortar or concrete when being mixed with water. The dry mix is ready to be used and only water needs to be added prior to the printing process. Therefore, contrary to the prior art cited above, no admixtures need to be added at the deposition head.

The invention allows concrete manufacturers to produce 3D printing concrete using only one dry mixture, instead of mixing various components on site. Customer benefits are regularity of the quality of the concrete produced and ease-of-use, which leads to cost savings. This in turns enables that non-stop continuous production can be achieved to produce high structures by 3D printing.

Due to the cementitious material mixture being in the form of a dry mix, all components thereof are present in dry form. In particular, the hydraulic cement, the at least one viscosity enhancing admixture, and the at least one accelerator are present in powder form.

The dry mix according to the invention contains all admixtures needed for producing a fresh concrete that has the desired properties for 3D printing. In particular, the dry mix contains at least one viscosity enhancing admixture and at least one setting accelerator. The viscosity enhancing admixture increases the viscosity and thus ensures the thixotropy and/or yield strength development before setting begins, i.e. from just after mixing with water up to typically 30-60 minutes thereafter. Due to its increased viscosity the fresh concrete or mortar is sufficiently firm in order to provide the required mechanical stability of the 3D printed structure before the hydraulic cement sets. In particular, the lower layers of the construction can sustain the load imposed by upper layers without collapsing.

The at least one accelerator is required to manage the yield strength development of the material, especially after the initial setting time. The effect of the accelerator takes over for yield strength development up to the final setting of the material and also beneficially influences the hardening process.

The at least one viscosity enhancing admixture is present in an amount of 0.05-1.5% by weight, preferably 0.2-0.6% by weight, based on the hydraulic cement. The indicated amount by weight represents the sum of all viscosity enhancing admixtures present in the dry mix. If only one single viscosity enhancing admixture is present in the mix, said single admixture is present in an amount of, e.g., 0.05-1.5% by weight based on the hydraulic cement. If two or more viscosity enhancing admixtures are present in the dry mix, the total amount of said two or more admixtures represents 0.05-1.5% by weight based on the hydraulic cement.

The amount of 0.05-1.5% by weight, preferably 0.2-0.6% by weight, of viscosity enhancing admixture present in the dry mix has been selected in order to allow pumping of the fresh mortar or concrete to the deposition head on the one hand and to ensure that a layer of placed material has a sufficient stability in order not to collapse under its own weight or the weight of subsequent layer(s) placed on top. Preferably, the amount of the at least one viscosity enhancing admixture is selected such that the yield stress of the freshly placed construction material is 600-4000 Pa.

The addition of the viscosity enhancing admixture according to the invention results in that the increased yield stress property is attained almost instantly after placement, that is to say before the setting has occurred. Therefore, the increase in yield stress that is achieved by the viscosity enhancing admixture is independent from the setting process of the hydraulic cement of the construction material.

The at least one accelerator is present in an amount of 0.5-6.0% by weight, preferably 1.5-4% by weight, based on the hydraulic cement. As with the viscosity enhancing admixture, the indicated amount by weight represents the sum of all accelerator admixtures present in the dry mix.

The dry mixture contains a hydraulic cement, which is a hydraulic binder comprising at least 50 wt.-% of CaO and $SiO_2$ that sets due to a chemical hydration reaction between the dry ingredients and water. The hydraulic cement may contain other components in addition to CaO and $SiO_2$. Various mineral additions, such as, e.g., silica fume, granulated blast-furnace slag (gbfs), fly ash, natural pozzolans, calcined clays or ground limestone, may be added to Portland cement, in order to obtain Portland composite cements. The mineral additions, typically between 10 and 50 wt.-% of the total weight of the hydraulic cement, are in most applications ground granulated blast furnace slag, fly ash, pozzolans, ground limestone or mixtures thereof. The addition of silica fume can be of particular benefit for the production of high strength 3D printed concrete or mortar, i.e. having a compressive strength at 28 days of at least 70 MPa.

The hydraulic cement may also be a fine or an ultrafine cement, i.e. a hydraulic cement that is ground to a higher fineness than standard hydraulic cements. The fineness can for example be higher that 5000 $cm^2/g$ and reach values up to 13000 $cm^2/g$ or even 15000 $cm^2/g$ (expressed as cement Blaine fineness).

According to a preferred embodiment, the dry cementitious material mixture does not contain any aluminate cement, such as calcium aluminate cement. Alternatively, aluminate cement such as calcium aluminate cement, may be present in an amount of <1.5% by weight, preferably <1.0% by weight, based on the total amount of hydraulic cement.

Calcium aluminate cements are cements consisting predominantly of hydraulic calcium aluminates. Alternative names are "aluminous cement", "high-alumina cement" and "Ciment fondu" in French. Calcium aluminate cements have a short initial setting time, so that they are considered less preferred. A hydraulic cement having a short initial setting time will increase the risk that material builds up in the deposition head. Further, a short initial setting time may reduce the bonding strength between the layers placed one above the other, because the preceding layer may not be fresh any more when a subsequent layer is placed. Limiting the content of calcium aluminate cement is also preferred in terms of costs, since calcium aluminate cement is relatively expansive.

Generally, the initial setting time is defined as the time elapsed between the moment water is added to the cement to the time at which the cement paste starts losing its plasticity. In particular, the initial setting time is that time period between the time water is added to the cement and the time at which a 1 mm square section needle fails to penetrate the cement paste, placed in the Vicat's mould 5 mm to 7 mm from the bottom of the mould.

Preferably, the hydraulic cement present in the dry mix consists of Portland cement, i.e. the dry mix does not contain any hydraulic binder other than Portland cement. Portland cement is a cement of the type CEM I as described according to the European NF EN 197-1 Standard of April 2012.

Other suitable cements that may be used in the invention comprise the cements of the types CEM II, CEM III, CEM IV or CEM V described according to the European NF EN 197-1 Standard of April 2012.

According to another embodiment of the invention, the hydraulic cement comprises, or consists of, Portland cement and an aluminate cement, wherein said aluminate cement is present in an amount of <1.5% by weight, preferably in an amount of <1.0% by weight, based on the total amount of hydraulic cement.

According to a preferred embodiment of the invention, the hydraulic cement has a specific surface (Blaine) of 3000-8000 $cm^2/g$, preferably 3500-6000 $cm^2/g$.

Various types of accelerators may be used in the dry mix. Preferably, the at least one accelerator comprises calcium formate, calcium chloride and/or calcium nitrite.

According to another aspect, the at least one accelerator may be an organic accelerator, preferably calcium formate. Organic accelerators, in particular calcium formate, do not have a significant impact on the setting time of hydraulic materials. In the present invention, setting times that are too short are not desired. Longer setting times avoid that material builds up in the deposition head and at the nozzle of the deposition head. Also, longer setting times reduce the risk of clogging and thus offer much more flexibility in pumping the material. Further, longer setting times offer more flexibility in operation: the mortar does not need to be used to print as quickly as possible after its production. Further, an improved bonding between the layers that are printed is observed, as the delayed setting time allows the layers to bond in their fresh state. Nevertheless, organic accelerators, such as calcium formate, provide an adequate early strength (i.e. hardening), once setting has occurred. In addition, the overall printing process remains fast, because of the choice of viscosity enhancing admixture included in the dry mix, which provides the desired yield stress for the layers of printed material to sustain their own weight and the weight of additional fresh layers before the setting and hardening occurs.

In case the hydraulic cement comprises a limited amount of a calcium aluminate cement, a preferred embodiment provides that the at least one accelerator comprises sodium carbonate. Preferably sodium carbonate is used in combination with calcium formate.

Preferably, the dry cementitious material mixture further comprises a setting retarder, such as citric acid.

The combined use of sodium carbonate and citric acid allows to manage the accelerating effect of the aluminate cement. Use of sulphate aluminate cement with sodium carbonate and citric acid may also reduce the volume change up to 1 day, potentially reducing the risk of cracking due to significant volume reducing at very early age.

According to a preferred embodiment, the at least one viscosity enhancing admixture comprises an organic material such as unmodified polysaccharides (such as guar gum, diutan gum, or xanthan gum) or modified polysaccharides (such as cellulose ether, starch ether, or guar ether), acrylic polymers (such as ethoxylated urethane, alkali swellable emulsion, or copolymers of acrylic acid), and/or an inorganic material such as clay, in particular laponite and/or bentonite and/or sepiolite, or mixtures thereof. A non-expanding clay, such as sepiolite, is preferred. Preferably, a thickening agent may be used as said viscosity enhancing admixture. Good results have been achieved with the following admixtures: Mecellose® HiEND 2001 by LOTTE Fine Chemical is a cellulosic thickener that provides good adhesion strength between the extruded layers, viscosity, workability, and good water retention. Cimsil A55 by TOLSA S.A. is a sepiolite clay based thickener that helps to improve extrudability of the concrete, consequently slightly reduces the adhesion.

Preferably, the dry cementitious material mixture further comprises fibers, preferably cellulose fibers. Fibers have the effect of increasing the tensile strength of the mortar or concrete once hardened.

Cellulose fibers are preferred because of their ability to retain water and increasing the robustness of the system as regards variations of the quantity of water (water/cement ratio). This means that small variations of the effective water/cement ratio in operations do not compromise the quality of the printing. Cellulose fibers also facilitate printing processes in hot weather by binding water which is less susceptible to evaporate.

In order to enhance the conveyability or pumpability of the fresh mortar or concrete to the deposition head, the dry cementitious material mixture may further comprise a plasticizer or superplasticizer, preferably a plasticizer based on polycarboxylate or phosphonates. The presence of a plasticizer or a superplasticizer increases the workability at a given amount of water.

Good results have been achieved with the following types of superplasticizers: ViscoCrete® 225 P by Sika, CHRYSO® Premia product range, PCP based high range water reducers, BASF MasterGlenium 27, a PCP based high range water reducer, and CHRYSO® Optima 100, a phosphonate based high range water reducer.

Preferably, the dry cementitious material mixture comprises 0.05 to 1.0% by weight of a plasticizer or a superplasticizer, based on the hydraulic cement. The preferred dosage of the type of plasticizer or superplasticizer depends on its type, on the type of cement and on the desired flow of the mortar.

In another embodiment, the plasticizer or the superplasticizer can be added diluted into the mixing water instead of added to the dry premix.

Optionally, the dry cementitious material mixture comprises additional commercial admixtures such a shrinkage reducing agents, pigments, or air entrainers.

According to a preferred embodiment of the invention the aggregates consist of particles having a maximum particle size of 16 mm, preferably a maximum particle size of 10 mm.

Preferably, the aggregates comprise fine aggregates, such as sand, having a maximum particle size of 4 mm, and optionally coarse aggregates having a maximum particle size of 10 mm.

The fine aggregates may consist of or comprise crushed limestone.

Preferably, the aggregates are present in an amount of 50-80% by weight based on the dry cementitious material mixture.

Accordingly, the hydraulic cement is preferably present in an amount of 25-45% by weight based on the dry cementitious material mixture.

According to a second aspect of the invention a method of placing a flowable construction material for building structural components layer-by-layer, such as for 3D concrete printing is provided, said method comprising:

providing a dry cementitious material mixture according to the first aspect of the invention, mixing the dry cementitious material mixture with water to obtain a flowable construction material, conveying, preferably pumping, the flowable construction material to a deposition head, placing the construction material through an outlet of the deposition head in order to form a layer of construction material, wherein no admixtures are added to the flowable construction material in or at the deposition head, wherein a plurality of layers of construction material are placed one onto the other.

Thus, the invention provides an easy procedure for 3D printing a cementitious material, wherein all components are contained in the dry cementitious material mixture, which only needs to be mixed with water and placed via a deposition head of a robot. In particular, no admixtures need to be added once the dry cementitious material mixture has been mixed with water.

According to the invention, no admixtures are added to the flowable construction material in or at the deposition head.

Preferably, the step of placing the construction material through an outlet of the deposition head comprises extruding the construction material in a pasty form through a nozzle of the deposition head.

In this connection, a preferred mode of operation consists in that, after the placement of a first layer of construction material, at least one subsequent layer of construction material is placed onto the first layer, wherein the amount of viscosity enhancing admixture present in the dry cementitious material mixture is selected so as to achieve a yield stress that is sufficient so that the first layer does not collapse and/or does not deform under the load of said at least one subsequent layer.

In this connection, "not collapsing" means that the height of the layer is not reduced by more than 10%, preferably more than 5%, under the load of the at least one subsequent layer.

"Not deforming" means that the layers maintain their shape as extruded until setting occurs.

Preferably, the flowable construction material has a yield strength of 0.25-8 kPa when being placed.

The step of mixing water with the dry cementitious material mixture may be performed by means of a continuous mixer or by means of a batch mixer.

Preferably, warm water having a temperature of 20-30° C. may be used in the mixing step for the preparation of the flowable construction material to further accelerate the setting, if required, in particular in case of outside 3D printing in cold weather.

Preferably, the amount of water mixed with the dry cementitious material mixture is selected to obtain a water/dry cementitious material mixture weight ratio of 0.09-0.23, preferably 0.09-0.18.

According to a third aspect of the invention a use of a dry cementitious material mixture, for 3D-concrete-printing through a deposition head with no addition of any admixture in or at the deposition head, after having been mixed with water, is provided.

Thus, the invention provides for a use of a dry mix that contains all the ingredients and admixtures that are needed for obtaining a fresh mortar or concrete when being mixed with water and hence prevents the necessity of mixing various components on site.

Further, contrary to the prior art cited at the outset, according to the invention a use is provided, during which no admixtures need to be added in or at the deposition head, which ensures easy handling of the fresh mortar or concrete.

The invention will now be described in more detail by reference to the following examples.

In the following examples various dry cementitious material mixtures where provided, which were used for preparing mortar. The mortar was prepared according to the following procedure:

- using a standard Perrier mortar mixer
- add all powder components into the mixer mixing the powder with low speed (140 r/min) for 2 minutes
- adding water within 15 seconds while keeping on mixing for 2 minutes The following components were used in the dry cementitious material mixtures described below. All components are in powder form:

| Component | Abbreviation | Type | Supplier/ Origin |
|---|---|---|---|
| CEM I 52, 5R SR3 | CEM I | Ordinary Portland Cement | LafargeHolcim Spain - Carboneras plant |
| Limestone crushed 0/2 | | Limestone sand, maximum size 2 mm | LafargeHolcim Spain |
| Limestone crushed 0/4 | | Limestone sand, maximum size 4 mm | LafargeHolcim Spain |
| Saint Bonnet 5/10 R | | Aggregate, size from 5 to 10 mm | LafargeHolcim France |
| Viscocrete 225 P | SP | Superplasticizer | Sika |
| Mecellose Hiend 2001 | VEA1 | Viscosity enhancing admixture | Lotte Fine Chemical |
| Cimsil A55 | VEA2 | Viscosity enhancing admixture | TOLSA S.A. |
| Arbocel FI 540 CA | Fiber1 | Cellulose microfiber | G-Biosciences |
| Neuflex AC 6 mm | Fiber2 | Fiber | Neuvendis |
| Calcium formate | ACC1 | Accelerator | Sigma Aldrich |
| DENKA SC1 | CA | Blend of calcium aluminate cement and calcium sulphate | Kerneos |
| Sodium carbonate | ACC2 | Accelerator for DENKA SC1 | Sigma Aldrich |
| Citric acid | Ret | Retarder for DENKA SC1 | Sigma Aldrich |
| Ciment Fondu | CF | Aluminate cement | Kerneos |
| Calcium chloride ($CaCl_2$) | ACC3 | OPC Accelerator | Sigma Aldrich |
| Calcium nitrite $Ca(NO_2)_2$ | ACC4 | OPC Accelerator | Sigma Aldrich |

Examples nos. 1-18 (Table 1 and 2) refer to mortars that have been prepared based on a dry cementitious material mixture according to the invention.

Reference examples nos. 1-5 (Table 3 and 4) refer to mortars that have been prepared based on a dry cementitious material mixture that does not correspond to the invention.

TABLE 1

| Ex | | CEM I | Sand | Sand | AGG | SP | VEA1 | VEA2 | Fiber 1 | Fiber 2 | ACC1 | ACC4 | ACC3 | Effective water |
|---|---|---|---|---|---|---|---|---|---|---|---|---|---|---|
| 1 | weight for 1 $m^3$ [kg] | 559.58 | 606.2 [1] | 682.68 [2] | 0 | 0.744 | 1.119 | 1.511 | 0.56 | 0.47 | 13.055 | 0.00 | 0.00 | 308.96 |
| | wt-% of dry mix | 30.0 | 32.5 | 36.6 | 0.0 | 0.040 | 0.060 | 0.081 | 0.030 | 0.025 | 0.70 | 0.000 | 0.000 | 17 |
| | wt-% of cement | 100.00 | 108.33 | 122.00 | 0.00 | 0.13 | 0.20 | 0.27 | 0.10 | 0.08 | 2.33 | 0.00 | 0.00 | 55 |

TABLE 1-continued

| Ex | | CEM I | Sand | Sand | AGG | SP | VEA1 | VEA2 | Fiber 1 | Fiber 2 | ACC1 | ACC4 | ACC3 | Effective water |
|---|---|---|---|---|---|---|---|---|---|---|---|---|---|---|
| 2 | weight for 1 $m^3$ [kg] | 559.58 | 606.2 [1] | 682.7 [2] | 0 | 0.67 | 1.49 | 0 | 0 | 0.47 | 13.06 | 0.00 | 0.00 | 308.96 |
| | wt-% of dry mix | 30.02 | 32.52 | 36.62 | 0.00 | 0.040 | 0.08 | 0.00 | 0.00 | 0.03 | 0.70 | 0.000 | 0.000 | 17 |
| | wt-% of cement | 100.00 | 108.33 | 122.00 | 0.00 | 0.12 | 0.27 | 0.00 | 0.00 | 0.08 | 2.33 | 0.00 | 0.00 | 55 |
| 3 | weight for 1 $m^3$ [kg] | 559.58 | 605.3 [1] | 681 [2] | 0 | 0.671 | 1.494 | 1.511 | 0 | 0.47 | 13.055 | 0.00 | 0.00 | 308.96 |
| | wt-% of dry mix | 30.0 | 32.5 | 36.6 | 0.00 | 0.036 | 0.08 | 0.08 | 0.0 | 0.03 | 0.7 | 0.000 | 0.000 | 17 |
| | wt-% of cement | 100.00 | 108.17 | 121.70 | 0.00 | 0.12 | 0.27 | 0.27 | 0.00 | 0.08 | 2.33 | 0.00 | 0.00 | 55 |
| 4 | weight for 1 m3 [kg] | 559.58 | 606.2 [1] | 682.7 [2] | 0 | 0.671 | 1.494 | 0 | 0 | 0.47 | 0 | 0.00 | 11.192 | 308.96 |
| | wt-% of dry mix | 30.05 | 32.55 | 36.66 | 0.00 | 0.036 | 0.08 | 0.00 | 0.00 | 0.03 | 0.00 | 0.000 | 0.60 | 17 |
| | wt-% of cement | 100.00 | 108.33 | 122.00 | 0.00 | 0.12 | 0.27 | 0.00 | 0.00 | 0.08 | 0.00 | 0.00 | 2.00 | 55 |
| 5 | weight for 1 $m^3$ [kg] | 559.58 | 606.2 [1] | 682.7 [2] | 0 | 0.671 | 1.494 | 0 | 0 | 0.47 | 0 | 9.792 | 0.00 | 308.96 |
| | wt-% of dry mix | 30.07 | 32.58 | 36.69 | 0.00 | 0.036 | 0.08 | 0.00 | 0.00 | 0.03 | 0.00 | 0.53 | 0.000 | 17 |
| | wt-% of cement | 100.00 | 108.33 | 122.00 | 0.00 | 0.12 | 0.27 | 0.00 | 0.00 | 0.08 | 0.00 | 1.75 | 0.00 | 55 |
| 6 | weight for 1 $m^3$ [kg] | 318.00 | 149.05 [3] | 781.20 [5] | 858.29 [7] | 0.42 | 0.64 | 0.85 | 0.32 | 0.27 | 7.42 | 0.00 | 0.00 | 185.50 |
| | wt-% of dry mix | 15.0 | 7.0 | 36.9 | 40.6 | 0.020 | 0.030 | 0.040 | 0.015 | 0.013 | 0.351 | 0.000 | 0.000 | 9 |
| | wt-% of cement | 100.0 | 46.9 | 245.7 | 269.9 | 0.133 | 0.200 | 0.267 | 0.100 | 0.083 | 2.333 | 0.00 | 0.00 | 58 |
| 7 | weight for 1 $m^3$ [kg] | 352.00 | 142.08 [3] | 744.72 [5] | 818.21 [7] | 0.47 | 0.70 | 0.94 | 0.35 | 0.29 | 8.21 | 0.00 | 0.00 | 205.33 |
| | wt-% of dry mix | 17.0 | 6.9 | 36.0 | 39.6 | 0.023 | 0.034 | 0.045 | 0.017 | 0.014 | 0.397 | 0.000 | 0.000 | 10 |
| | wt-% of cement | 100.0 | −40.4 | 211.6 | 232.4 | 0.133 | 0.200 | 0.267 | 0.100 | 0.083 | 2.333 | 0.00 | 0.00 | 58 |
| 8 | weight for 1 $m^3$ [kg] | 393.00 | 133.82 [3] | 701.42 [5] | 770.64 [7] | 0.52 | 0.79 | 1.05 | 0.39 | 0.33 | 9.17 | 0.00 | 0.00 | 229.25 |
| | wt-% of dry mix | 19.5 | 6.7 | 34.9 | 38.3 | 0.026 | 0.039 | 0.052 | 0.020 | 0.016 | 0.456 | 0.000 | 0.000 | 11 |
| | wt-% of cement | 100.0 | 34.1 | 178.5 | 196.1 | 0.133 | 0.200 | 0.267 | 0.100 | 0.083 | 2.333 | 0.00 | 0.00 | 58 |
| 9 | weight for 1 $m^3$ [kg] | 364.00 | 605.95 [4] | 581.21 [6] | 524.58 [8] | 0.49 | 0.73 | 0.97 | 0.36 | 0.30 | 8.49 | 0.00 | 0.00 | 212.33 |
| | wt-% of dry mix | 17.4 | 29.0 | 27.8 | 25.1 | 0.023 | 0.035 | 0.047 | 0.017 | 0.015 | 0.407 | 0.000 | 0.000 | 10 |
| | wt-% of cement | 100.0 | 166.5 | 159.7 | 144.1 | 0.133 | 0.200 | 0.267 | 0.100 | 0.083 | 2.333 | 0.00 | 0.00 | 58 |
| 10 | weight for 1 $m^3$ [kg] | 416.00 | 560.46 [4] | 537.57 [6] | 485.19 [8] | 0.55 | 0.83 | 1.11 | 0.42 | 0.35 | 9.71 | 0.00 | 0.00 | 242.67 |
| | wt-% of dry mix | 20.7 | 27.9 | 26.7 | 24.1 | 0.028 | 0.041 | 0.055 | 0.021 | 0.017 | 0.482 | 0.000 | 0.000 | 12 |
| | wt-% of cement | 100.0 | 134.7 | 129.2 | 116.6 | 0.133 | 0.200 | 0.267 | 0.100 | 0.083 | 2.333 | 0.00 | 0.00 | 58 |
| 11 | weight for 1 $m^3$ [kg] | 450.00 | 530.20 [4] | 508.54 [6] | 458.99 [8] | 0.60 | 0.90 | 1.20 | 0.45 | 0.38 | 10.50 | 0.00 | 0.00 | 262.50 |
| | wt-% of dry mix | 22.9 | 27.0 | 25.9 | 23.4 | 0.031 | 0.046 | 0.061 | 0.023 | 0.019 | 0.535 | 0.000 | 0.000 | 13 |
| | wt-% of cement | 100.0 | 117.8 | 113.0 | 102.0 | 0.133 | 0.200 | 0.267 | 0.100 | 0.083 | 2.333 | 0.00 | 0.00 | 58 |

[1] Limestone sand having a maximum particle size of 2 mm (LafargeHolcim Spain)
[2] Limestone sand having a maximum particle size of 4 mm (LafargeHolcim Spain)
[3] Siliceous sand from La sabliére CCSH having a maximum particle size of 1 mm.
[4] Limestone sand from Cassis having a maximum particle size of 1.6 mm
[5] Siliceous sand from PUMP-Saint Bonnet having a maximum particle size of 5 mm
[6] Limestone sand from Cassis having a particle size of between 1.6 mm and 6 mm
[7] Siliceous aggregates from PUMP-Saint Bonnet having a particle size of between 5 mm and 10 mm
[8] Limestone aggregates from Cassis having a particle size of between 6 mm and 10 mm

TABLE 2

| Ex | | CEM I | Sand | Sand | AGG | SP | VEA1 | VEA2 | Fiber 1 | Fiber 2 | ACC1 | CA | ACC2 | Ret | Water |
|---|---|---|---|---|---|---|---|---|---|---|---|---|---|---|---|
| 12 | weight for 1 $m^3$ [kg] | 588.4 | 594.3 [1] | 735.5 [2] | 0.0 [7] | 0.8 | 0.6 | 1.0 | 2.0 | 1.0 | 7.9 | 7.9 | 19.6 | 2.0 | 266.0 |
| | wt-% of dry mix | 30.01 | 30.31 | 37.51 | 0.00 | 0.04 | 0.03 | 0.05 | 0.10 | 0.05 | 0.4 | 0.40 | 1.00 | 0.10 | 14 |
| | wt-% of cement | 100.0 | 47.5 | 248.8 | 0 | 0.1 | 0.1 | 0.2 | 0.3 | 0.2 | 1.3 | 1.3 | 3.3 | 0.3 | 45 |
| 13 | weight for 1 $m^3$ [kg] | 314.0 | 149.0 [3] | 781.2 [5] | 858.3 [7] | 0.4 | 0.3 | 0.5 | 1.0 | 0.5 | 4.2 | 4.2 | 10.5 | 1.0 | 183.2 |
| | wt-% of dry mix | 14.84 | 7.04 | 36.91 | 40.55 | 0.02 | 0.01 | 0.02 | 0.05 | 0.02 | 0.20 | 0.20 | 0.49 | 0.05 | 9 |
| | wt-% of cement | 100.0 | 47.5 | 248.8 | 273.3 | 0.1 | 0.1 | 0.2 | 0.3 | 0.2 | 1.3 | 1.3 | 3.3 | 0.3 | 58 |
| 14 | weight for 1 $m^3$ [kg] | 348 | 142.08 [3] | 744.71 [5] | 818.20 [7] | 0.464 | 0.348 | 0.58 | 1.16 | 0.58 | 4.64 | 4.64 | 11.6 | 1.16 | 203 |
| | wt-% of dry mix | 16.8 | 6.9 | 36.0 | 39.6 | 0.025 | 0.018 | 0.031 | 0.1 | 0.0 | 0.2 | 0.2 | 0.6 | 0.1 | 10 |
| | wt-% of cement | 100.0 | 40.8 | 214.0 | 235.1 | 0.1 | 0.1 | 0.2 | 0.3 | 0.2 | 1.3 | 1.3 | 3.3 | 0.3 | 58 |
| 15 | weight for 1 $m^3$ [kg] | 388.0 | 133.8 [3] | 701.4 [5] | 770.6 [7] | 0.5 | 0.4 | 0.6 | 1.3 | 0.6 | 5.2 | 5.2 | 12.9 | 1.3 | 226.3 |
| | wt-% of dry mix | 19.29 | 6.65 | 34.88 | 38.32 | 0.03 | 0.02 | 0.03 | 0.06 | 0.03 | 0.26 | 0.26 | 0.64 | 0.06 | 11 |
| | wt-% of cement | 100 | 34.48 | 180.8 | 198.6 | 0.13 | 0.1 | 0.15 | 0.3 | 0.2 | 1.3 | 1.3 | 3.3 | 0.36 | 58 |
| 16 | weight for 1 $m^3$ [kg] | 360.0 | 606.0 [4] | 581.2 [6] | 524.6 [8] | 0.5 | 0.4 | 0.6 | 1.2 | 0.6 | 4.8 | 4.8 | 12.0 | 1.2 | 210.0 |
| | wt-% of dry mix | 17.25 | 29.03 | 27.85 | 25.13 | 0.02 | 0.02 | 0.03 | 0.06 | 0.03 | 0.23 | 0.23 | 0.57 | 0.06 | 10 |
| | wt-% of cement | 100 | 168.3 | 161.4 | 145.7 | 0.14 | 0.11 | 0.16 | 0.3 | 0.2 | 1.33 | 1.33 | 3.33 | 0.33 | 58 |
| 17 | weight for 1 $m^3$ [kg] | 411.0 | 560.5 [4] | 537.6 [6] | 485.2 [8] | 0.5 | 0.4 | 0.7 | 1.4 | 0.7 | 5.5 | 5.5 | 13.7 | 1.4 | 239.8 |
| | wt-% of dry mix | 20.4 | 27.9 | 26.7 | 24.1 | 0.02 | 0.02 | 0.03 | 0.07 | 0.03 | 0.3 | 0.3 | 0.7 | 0.07 | 12 |
| | wt-% of cement | 100.0 | 136.4 | 130.8 | 118.1 | 0.1 | 0.1 | 0.2 | 0.3 | 0.2 | 1.3 | 1.3 | 3.3 | 0.3 | 58 |
| 18 | weight for 1 $m^3$ [kg] | 445.0 | 530.20 [4] | 508.54 [6] | 458.99 [8] | 0.59 | 0.45 | 0.74 | 1.48 | 0.74 | 5.93 | 5.93 | 14.83 | 1.48 | 259.58 |
| | wt-% of dry mix | 22.68 | 27.03 | 25.92 | 23.40 | 0.03 | 0.02 | 0.04 | 0.08 | 0.04 | 0.30 | 0.30 | 0.76 | 0.08 | 13 |
| | wt-% of cement | 100.0 | 119.1 | 114.3 | 103.1 | 0.1 | 0.1 | 0.2 | 0.3 | 0.2 | 1.3 | 1.3 | 3.3 | 0.3 | 58 |

[1] Limestone sand having a maximum particle size of 2 mm (LafargeHolcim Spain)
[2] Limestone sand having a maximum particle size of 4 mm (LafargeHolcim Spain)
[3] Siliceous sand from La sabliére CCSH having a maximum particle size of 1 mm
[4] Limestone sand from Cassis having a maximum particle size of 1.6 mm
[5] Siliceous sand from PUMP-Saint Bonnet having a maximum particle size of 5 mm
[6] Limestone sand from Cassis having a particle size of between 1.6 mm and 6 mm
[7] Siliceous aggregates from PUMP-Saint Bonnet having a particle size of between 5 mm and 10mm
[8] Limestone aggregates from Cassis having a particle size of between 6 mm and 10 mm

TABLE 3

| | | CEM I | Sand 1 | Sand 2 | AGG | SP | VEA1 | VEA2 | Fiber1 | Fiber2 | ACC1 | CA | ACC2 | Ret | Water |
|---|---|---|---|---|---|---|---|---|---|---|---|---|---|---|---|
| Ref 1 | weight for 1 $m^3$ [kg] | 514.8 | 606.2 | 682.7 | 0 | 0.34 | 1.96 | 0 | 0 | 0.47 | 0 | 44.7 | 5.395 | 1.063 | 280 |
| | wt-% of dry mix | 27.7 | 32.6 | 36.8 | 0.0 | 0.02 | 0.1 | 0.0 | 00 | 0.03 | 0.0 | 2.4 | 0.3 | 0.1 | 15 |
| | wt-% of cement | 100 | 117.75 | 132.61 | 0.00 | 0.07 | 0.38 | 0.00 | 0.00 | 0.09 | 0.00 | 8.68 | 1.05 | 0.21 | 54 |
| Ref 2 | weight for 1 $m^3$ [kg] | 537.2 | 606.2 | 682.7 | 0 | 0.34 | 1.49 | 0 | 0 | 0.47 | 0 | 22.4 | 5.595 | 1.063 | 280 |
| | wt-% of dry mix | 28.9 | 32.6 | 36.8 | 0.0 | 0.02 | 0.1 | 0.0 | 0.0 | 0.03 | 0.0 | 1.2 | 0.3 | 0.1 | 15 |
| | wt-% of cement | 100 | 112.84 | 127.08 | 0.00 | 0.06 | 0.28 | 0.00 | 0.00 | 0.09 | 0.00 | 4.17 | 1.04 | 0.20 | 54 |

TABLE 3-continued

| | | CEM I | Sand 1 | Sand 2 | AGG | SP | VEA1 | VEA2 | Fiber1 | Fiber2 | ACC1 | CA | ACC2 | Ret | Water |
|---|---|---|---|---|---|---|---|---|---|---|---|---|---|---|---|
| Ref 3 | weight for 1 m$^3$ [kg] | 537.2 | 666.2 | 682.7 | 0 | 0.34 | 1.49 | 0 | 0 | 0.47 | 0 | 22.4 | 0 | 0 | 280 |
| | wt-% of dry mix | 28.9 | 32.6 | 36.8 | 0.0 | 0.02 | 0.1 | 0.0 | 0.0 | 0.03 | 0.0 | 1.2 | 0.0 | 0.0 | 15 |
| | wt-% of cement | 100 | 112.84 | 127.08 | 0.00 | 0.06 | 0.28 | 0.00 | 0.00 | 0.09 | 0.00 | 4.17 | 0.00 | 0.00 | 54 |
| Ref 4 | weight for 1 m$^3$ [kg] | 559.58 | 610 | 693 | 0 | 0.671 | 1.679 | 0 | 0 | 0.47 | 0 | 0 | 0 | 0 | 308.96 |
| | wt-% of dry mix | 30.0 | 32.7 | 37.2 | 0.0 | 0.04 | 0.1 | 0.0 | 0.0 | 0.03 | 0.0 | 0.0 | 0.0 | 0.0 | 17 |
| | wt-% of cement | 100 | 109.01 | 123.84 | 0.00 | 0.12 | 0.30 | 0.00 | 0.00 | 0.08 | 0.00 | 0.00 | 0.00 | 0.00 | 55 |

Sand 1 . . . Limestone sand having a maximum particle size of 2 mm (LafargeHolcim Spain)
Sand 2 . . . Limestone sand having a maximum particle size of 4 mm (LafargeHolcim Spain)

TABLE 4

| | | CEM I | Sand 1 | Sand 2 | AGG | SP | VEA1 | VEA2 | Fiber1 | Fiber2 | ACC1 | CF | ACC2 | Ret | Water |
|---|---|---|---|---|---|---|---|---|---|---|---|---|---|---|---|
| Ref 5 | weight for 1 m$^3$ [kg] | 514.8 | 606.2 | 682.7 | 0 | 0.336 | 1.958 | 0 | 0 | 0.47 | 0 | 44.7 | 0 | 0 | 308.96 |
| | wt-% of dry mix | 27.81 | 32.75 | 36.88 | 0.00 | 0.02 | 0.11 | 0.00 | 0.00 | 0.03 | 0.00 | 2.41 | 0.00 | 0.00 | 17 |
| | wt-% of cement | 100.00 | 117.75 | 132.61 | 0.00 | 0.07 | 0.38 | 0.00 | 0.00 | 0.09 | 0.00 | 8.68 | 0.00 | 0.00 | 55 |

Sand 1 . . . Limestone sand having a maximum particle size of 2 mm (LafargeHolcim Spain)
Sand 2 . . . Limestone sand having a maximum particle size of 4 mm (LafargeHolcim Spain)

TABLE 5

| | Temperature | Yield stress development by hand vane test. kPa | | | Stress at 10% deformation or strength development by compression, kPa | | | Bonding strength, MPa | | | | |
|---|---|---|---|---|---|---|---|---|---|---|---|---|
| | (° C.) | 0 min | 2 min | 5 min | 10 min | 20 min | 30 min | 30 min | 60 min | 90 min | 120 min | 5 min inter-layer |
| Ex 1 | 10 | 0.6 | 1.6 | 2.0 | 3.0 | 4.6 | 5.2 | N.M. | N.M. | N.M. | N.M. | N.M. |
| | 20 | 1.5 | 2.0 | 3.0 | 3.5 | 4.6 | 5.8 | 10.1 | 16.1 | 23.6 | 35.2 | 0.4 |
| Ex 12 | 10 | 0.5 | 2.0 | 4.5 | 5.6 | 14.2 | 29.5 | N.M. | N.M. | N.M. | N.M. | N.M. |
| | 20 | 1.3 | 2.9 | 5.1 | 6.5 | 17 | 34.8 | 30.3 | 179.3 | 502.2 | 1127.7 | — |
| Ex 2 | 10 | 0.2 | 0.6 | 2.0 | 3.8 | 6.6 | 8.2 | N.M. | N.M. | N.M. | N.M. | N.M. |
| | 20 | 0.2 | 0.8 | 1.0 | 2.2 | 3.2 | 4.1 | 6.3 | 12.4 | 22.5 | 44.6 | 1.1 |
| Ex 3 | 10 | N.M. | N.M. | N.M. | N.M. | N.M. | N.M. | N.M. | N.M. | N.M. | N.M. | N.M. |
| | 20 | 0.2 | 1.2 | 2.2 | 3.2 | 4.5 | 5.8 | 8.9 | 17.6 | 27.9 | 51.3 | N.M. |
| Ex 4 | 10 | N.M. | N.M. | N.M. | N.M. | N.M. | N.M. | N.M. | N.M. | N.M. | N.M. | N.M. |
| | 20 | 0.1 | 0.6 | 0.8 | 1.2 | 2 | 2.8 | N.M. | N.M. | N.M. | N.M. | N.M. |
| Ex. 5 | 10 | N.M. | N.M. | N.M. | N.M. | N.M. | N.M. | N.M. | N.M. | N.M. | N.M. | N.M. |
| | 20 | 0.2 | 0.6 | 1.2 | 1.3 | 2 | 2.7 | N.M. | N.M. | N.M. | N.M. | N.M. |
| Ref 1 | 10 | 0.2 | 0.5 | 1.0 | 4.2 | 16.3 | >34 | N.M. | N.M. | N.M. | N.M. | 0.5 |
| | 20 | 0.5 | 1.0 | 2.7 | 10.0 | >34 | | N.M. | N.M. | N.M. | N.M. | N.M. |
| Ref 2 | 10 | 0.2 | 1.0 | 2.0 | 4.2 | 8.8 | 18.6 | N.M. | N.M. | N.M. | N.M. | 0.5 |
| | 20 | 0.2 | 0.8 | 1.5 | 3.9 | 17.6 | NM | N.M. | N.M. | N.M. | N.M. | N.M. |
| Ref 3 | 10 | 0.5 | 1.2 | 2.0 | 3.0 | 3.6 | 3.8 | N.M. | N.M. | N.M. | N.M. | 0.4 |
| | 20 | 1.6 | 2.4 | 2.8 | 3.0 | 4.3 | 5.1 | N.M. | N.M. | N.M. | N.M. | N.M. |
| Ref 5 | 10 | 3.6 | 5.0 | 7.0 | 13.5 | 16.8 | 22.5 | N.M. | N.M. | N.M. | N.M. | N.M. |
| | 20 | 0.6 | 1.0 | 1.8 | 2.8 | 3.7 | 4.9 | 7.4 | 14.3 | 27.9 | 51.3 | 1.0 |
| Ref 4 | 10 | N.M. | N.M. | N.M. | N.M. | N.M. | N.M. | N.M. | N.M. | N.M. | N.M. | N.M. |
| | 20 | 0.4 | 0.9 | 1.2 | 1.8 | 2.2 | 2.6 | 5.3 | 8.7 | 13.4 | 44.6 | N.M. |

N.M.: not measured.

TABLE 6

| | Temperature | Setting time (Vicat), minute | | Density, | Strength at 24 hour, MPa | |
|---|---|---|---|---|---|---|
| | (° C.) | start | end | g/cm$^3$ | flexural | Compressive |
| Ex 1 | 10 | 650 | 720 | 2.17 | 2.3 | 7.7 |
| | 20 | 270 | 435 | 2.16 | 5.1 | 20.6 |
| Ex 12 | 10 | 87 | 119 | 2.22 | 1.7 | 3.2 |
| | 20 | 70 | 108 | 2.21 | 6.9 | 24.4 |
| Ex 2 | 10 | N.M. | N.M. | 2.13 | 3 | 10.1 |
| | 20 | 205 | 295 | 2.08 | 5.3 | 21.2 |
| Ex 3 | 10 | N.M. | N.M. | N.M. | N.M. | N.M. |
| | 20 | 210 | 260 | N.M. | N.M. | N.M. |
| Ex 4 | 10 | N.M. | N.M. | N.M. | N.M. | N.M. |
| | 20 | 180 | 260 | 2.10 | N.M. | N.M. |
| Ex. 5 | 10 | N.M. | N.M. | N.M. | N.M. | N.M. |
| | 20 | 230 | 300 | 2.13 | N.M. | N.M. |
| Ref 1 | 10 | 34 | 37 | 2.14 | 4.0 | 11.4 |
| | 20 | 20 | 32 | 2.03 | 6.92 | 23.6 |
| Ref 2 | 10 | >1440 | >1440 | N.M. | N.M. | N.M. |
| | 20 | 34 | 40 | 2.06 | 5.9 | 20.1 |
| Ref 3 | 10 | 557 | 627 | 2.12 | 3.7 | 11.0 |
| | 20 | 275 | 405 | 2.13 | 6.1 | 21.1 |
| Ref 5 | 10 | N.M. | N.M. | N.M. | N.M. | N.M. |
| | 20 | 200 | 300 | N.M. | N.M. | N.M. |
| Ref 4 | 10 | N.M. | N.M. | N.M. | N.M. | N.M. |
| | 20 | 315 | 390 | N.M. | N.M. | N.M. |

N.M.: not measured.

The mortars prepared according to Examples nos. 1-18 and the mortars prepared according to Reference Examples nos. 1-5 have been tested according to the following testing procedures, in order to obtain the results indicated in Tables 5 and 6.

The strength at 24 hours after placing and the setting time were determined using the Vicat needle test according to EN 196-3 of September 2017.

The yield stress is measured with a scissometer. A scissometer consists of a pale vane that has a diameter of 33 mm and a height of 50 mm. The pale is plunged into the material to be tested and to which an increasing torque is applied. When a failure occurs in the material, the vane starts to rotate, generally as the torque reaches its maximum value, which is considered as the characteristic value that is representative of the yield stress of the material. The yield stress measurement is preferably carried out within 30-60 sec after the material has been placed.

The yield stress at 10% of deformation/strength of cubic samples at very early age was obtained from cubic samples prepared and tested by a compression test at 30 minutes, 60 minutes, 90 minutes and 120 minutes after mixing. The testing method is the following:

- Cubic samples of dimension 5×50×50 cm are molded after mixing powder with water.
- 20 minutes after mixing, cubic samples are unmolded with care and placed in a lab at 20° C.+/−0.5° C. at 50%+/−5% relative humidity before testing.
- Unmolded samples are then tested by compression test at 30 minutes, 60 minutes, 90 minutes and 120 minutes after mixing.

The stress-deformation curve is obtained from the compression test for each sample. If the curve presents a lean drop of yield stress after reaching a maximum value, the maximum yield stress just before the drop is considered as the compressive strength of the tested sample. Otherwise, the yield stress that corresponds to a deformation of 10% is taken as an equivalent of compressive strength.

The adhesion (bonding strength) between material layers was measured according to the following method. A fresh mortar is prepared and deposited as a first layer on a surface. After a duration of 5 minutes, a second layer of the same mortar is deposited and the specimen is left to harden for a duration of 7 days at 20° C. The surface of the top layer is prepared and polished for it be to perfectly horizontal and smooth, before the tensile test is carried out to measure the strength of adhesion between the two layers. This measurement is made using standard laboratory methods.

The very early age deformation change was tested according to the following protocol. After mixing, the fresh mortar or concrete material is poured into a U shape mold, 60 cm in length, 7 cm in width and 5 cm in average depth. The two end faces of the mold in contact with the material are mobile. They move apart or closer according to the expansion or shrinkage of the material. The length change of the material is measured up to 2 days in 20° C.+/−1° C., 50% HR+/−5%. It gives an indication on the deformational change, of the material at an early age, combining the effect of chemical shrinkage, autogenous shrinkage and drying shrinkage.

The strength development of the embodiments of Examples 1, 2, 3 and 12 are shown in FIG. 1. The results show that Example 12 has the highest strength development, which is due to the presence of a small amount (0.40 wt.-% based on the dry mix) of calcium aluminate cement together with an accelerator (sodium carbonate) that accelerates the setting of the calcium aluminate cement.

The strength development of Examples 1, 2 and 3 compared to the strength development of reference examples Ref. 4 and 5 is shown in FIG. 2. The results show that the strength development is not sufficient with reference example Ref. 4, which is due to the absence of an accelerator.

Figure 1:
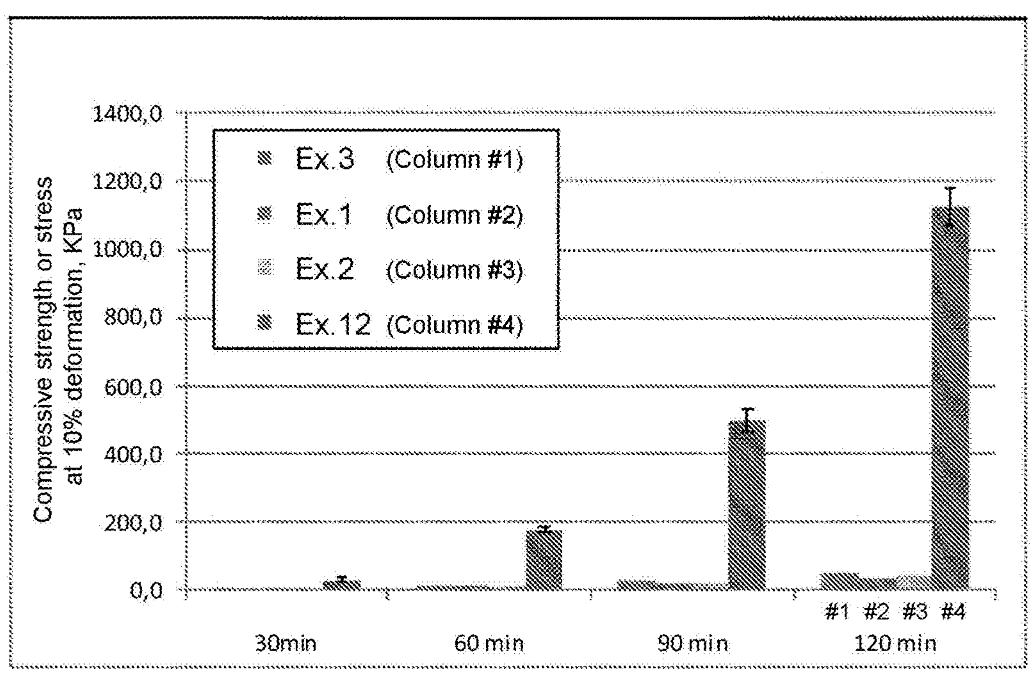
Figure 2:
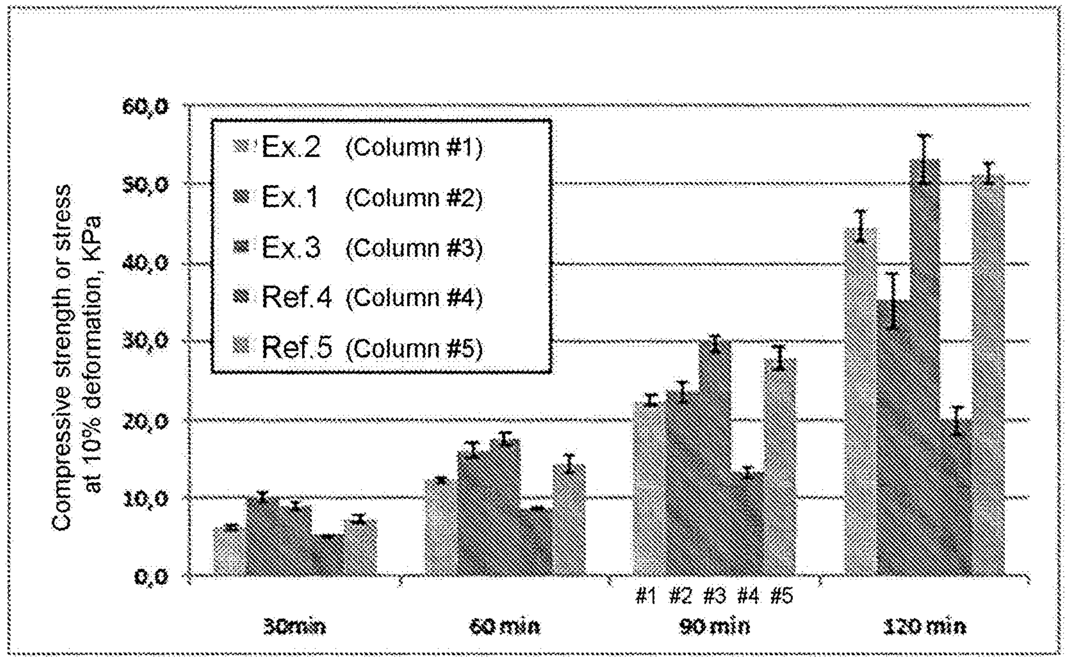
Figure 3:
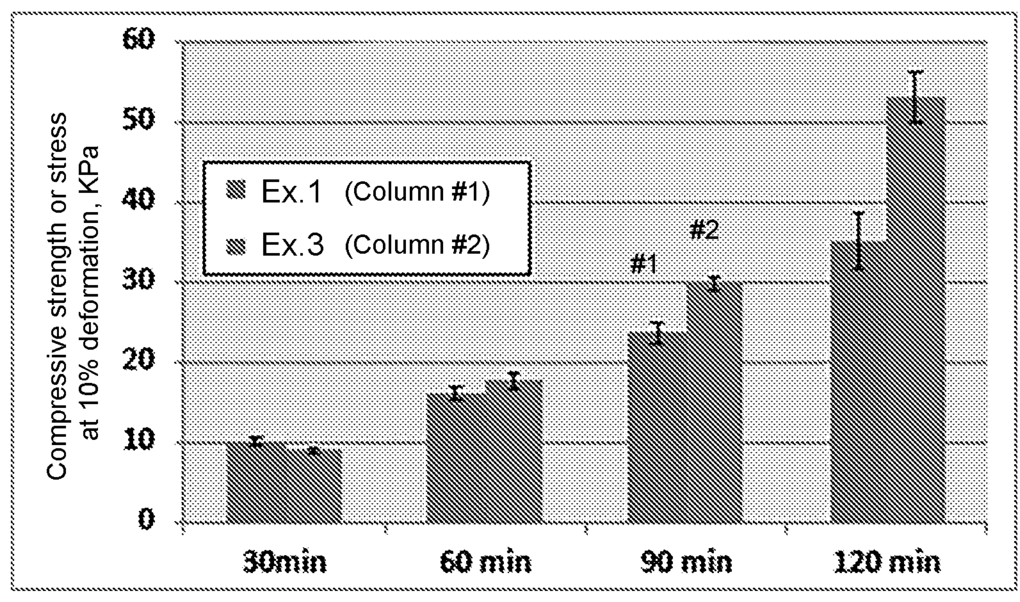
FIG. 3 illustrates the effect of the presence of cellulose microfibers in the dry mix when comparing Example 1 (with cellulose fibers) with Example 3 (without cellulose fibers). The strength development is improved when no cellulose microfibers are present in the dry mix.
Figure 4:
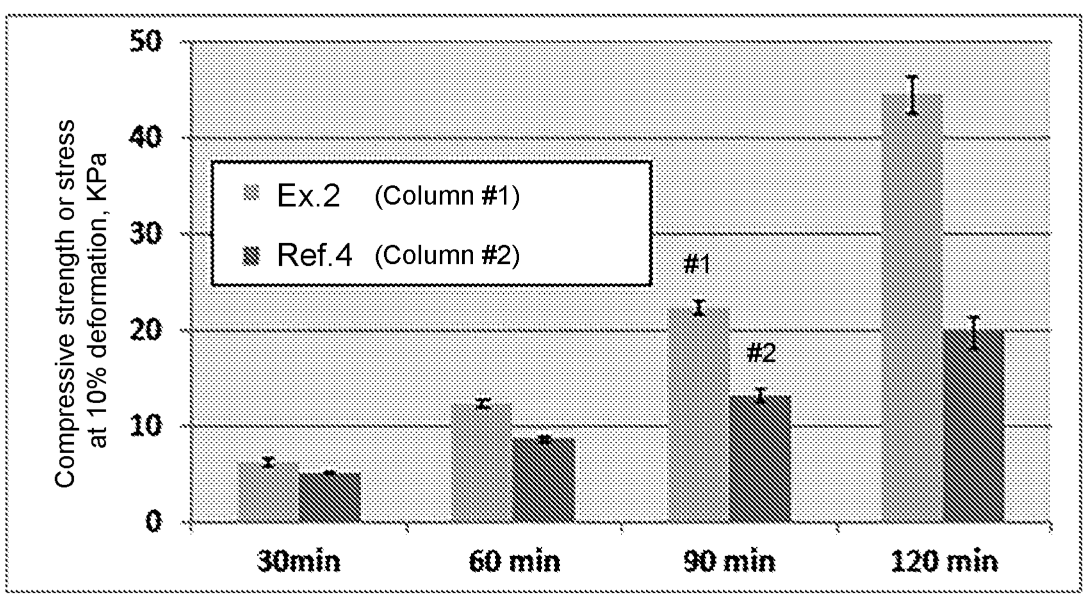
FIG. 4 illustrates the effect of the presence of calcium formate in the dry mix when comparing Example 2 (with calcium formate) with reference example Ref. 4 (without calcium formate). The strength development is significantly improved when calcium formate is present in the dry mix.
Figure 5:
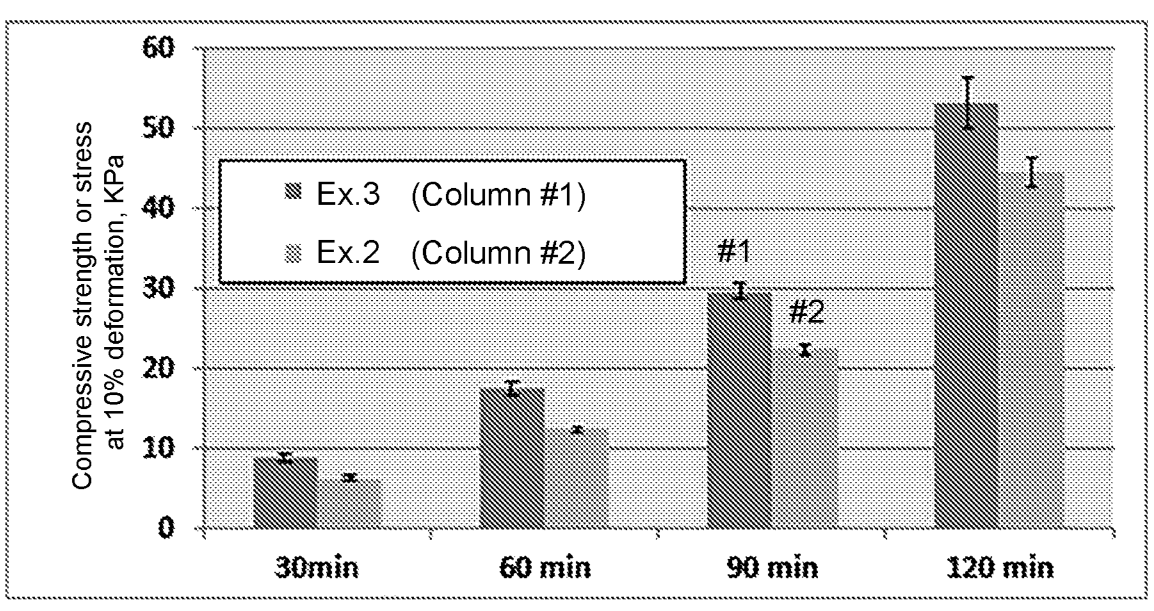
FIG. 5 illustrates the effect of the presence of a second viscosity enhancing admixture, namely Cimsil A55 in the dry mix when comparing Example 2 (without Cimsil A55) with example 3 (with Cimsil A55). The strength development is improved when the dry mix comprises Cimsil A55 as a second viscosity enhancing admixture.
Figure 6:
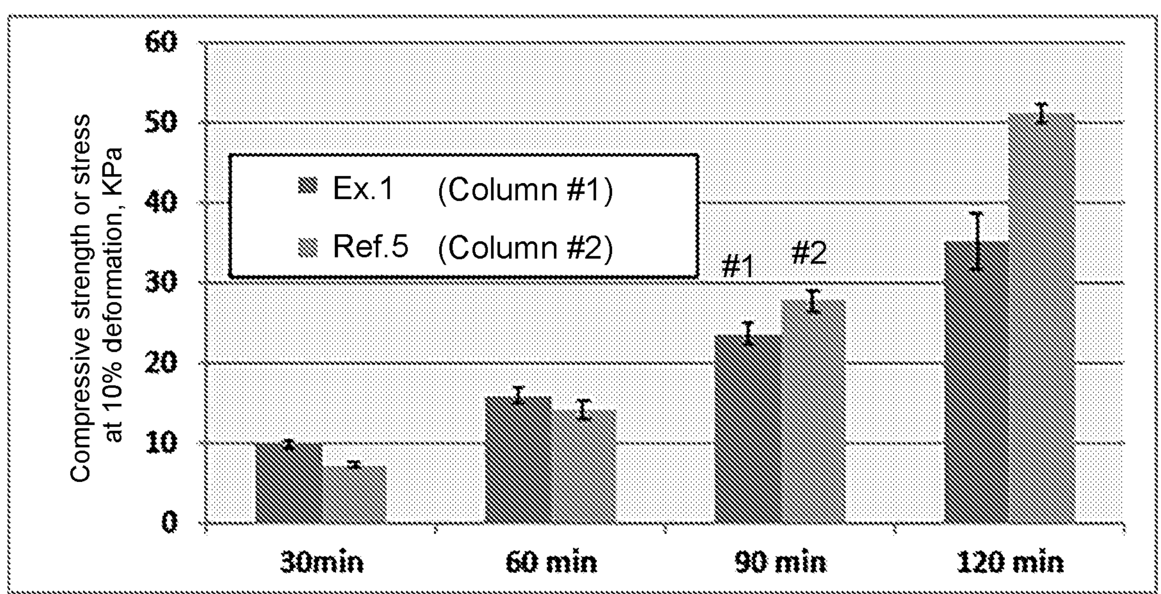

FIG. 6 compares the strength development of Example 1 to the strength development of reference example Ref. 5. Ref. 5 contains a considerable amount of aluminate cement, whereas Example 1 does not contain any (calcium) aluminate cement.

Figure 7:
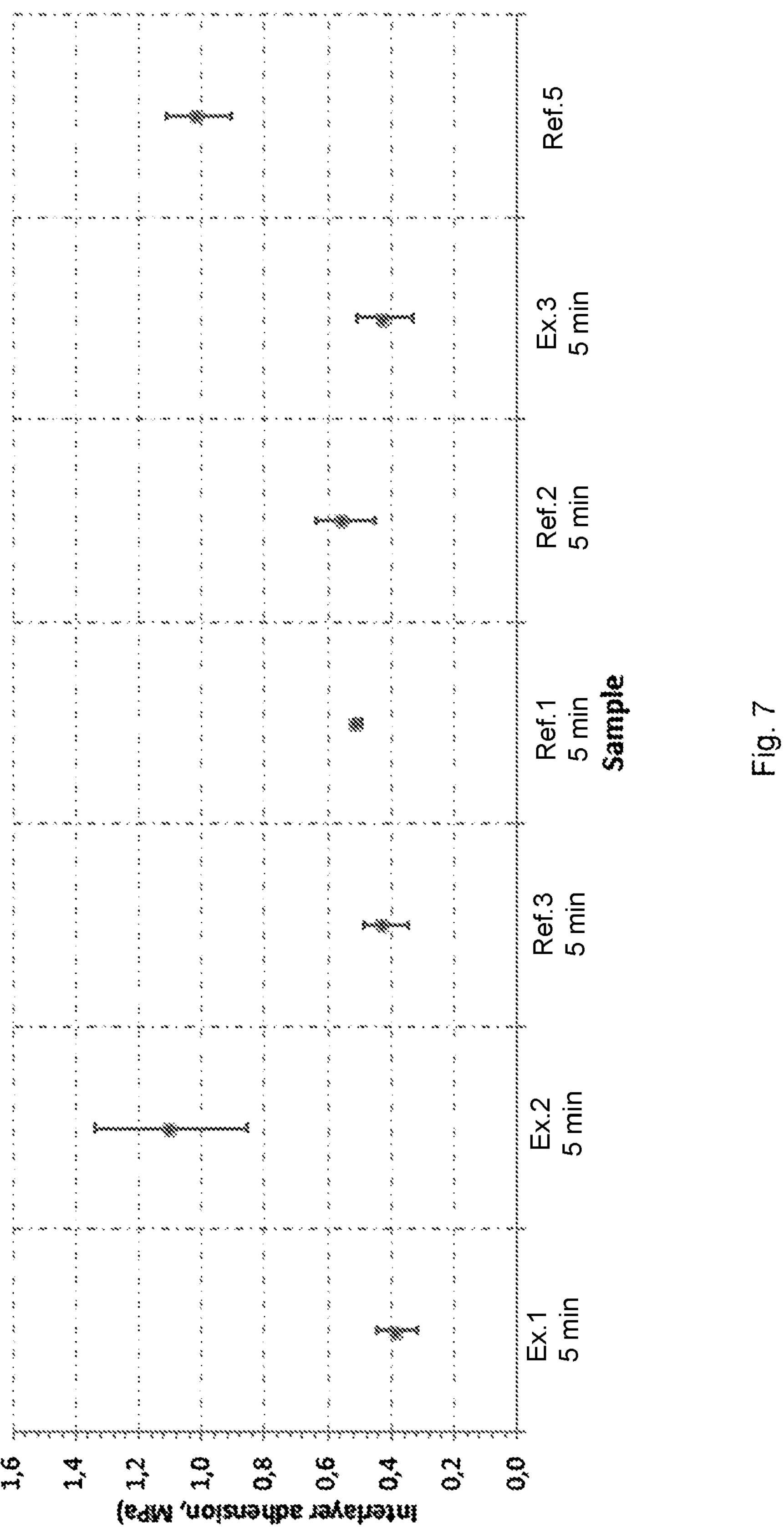

FIG. 7 illustrates the interlayer adhesion (bonding strength between layers) of Examples 1, 2 and 3 and of reference examples Ref. 1, 2, 3 and 5. The interlayer time for the different mixes was fixed at 5 minutes, which means that a second layer was printed 5 minutes after a first layer had been printed. When interlayer time increases, the bonding between layers will decrease. When comparing Examples 1, 2 and 3 in FIG. 7, it can be seen that adding Cimsil A55 to the dry mix reduces the interlayer bonding. However, Cimsil A55 facilitates the extrusion of material. Further, when comparing Example 2 with reference examples Ref. 1 and Ref. 2 it can be seen that the use of a calcium aluminate cement (in combination with sodium carbonate and citric acid) can accelerate the hydration of the cement for a better yield strength development, but reduces the interlayer bonding.

Figure 8:
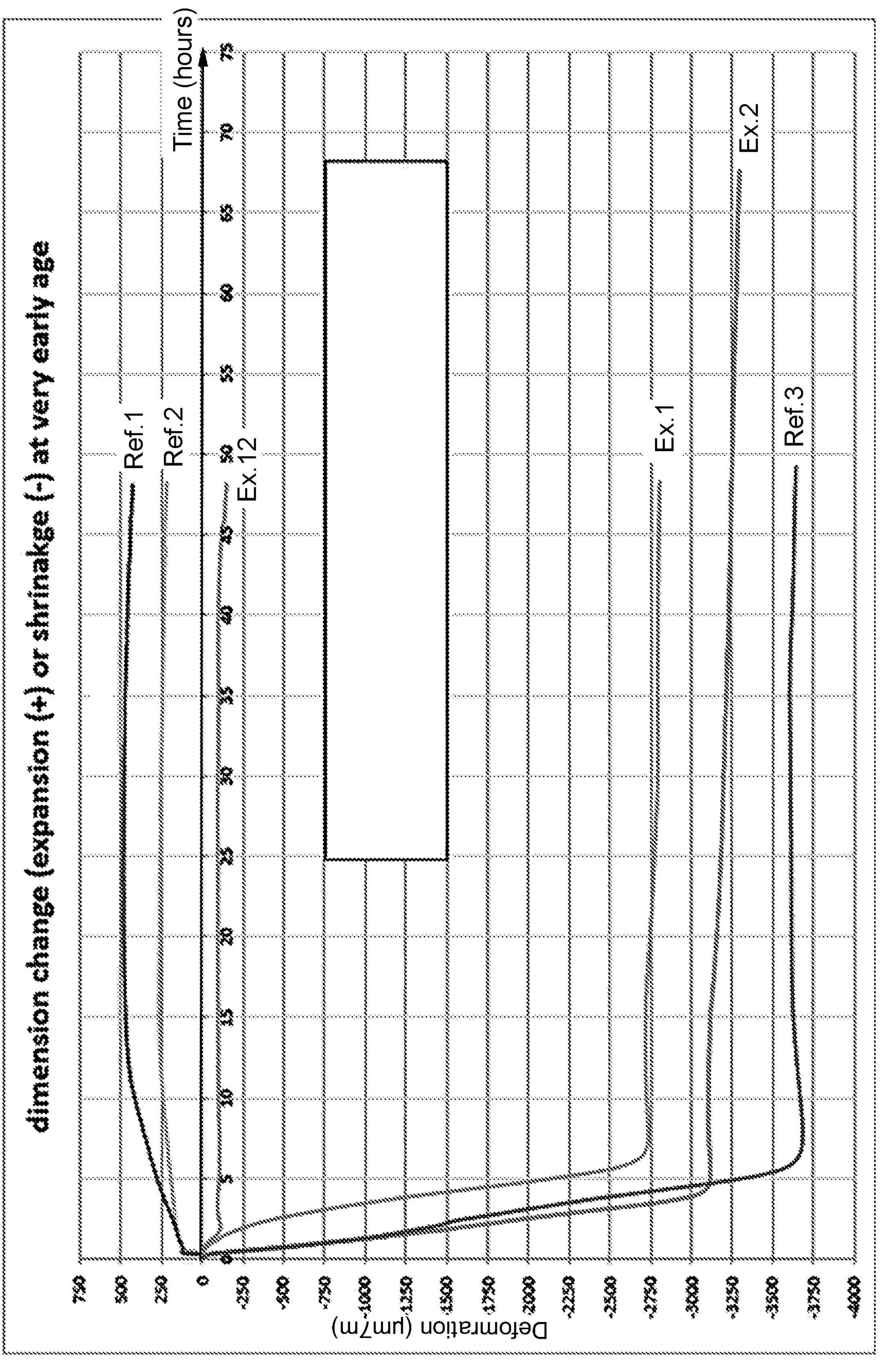

FIG. 8 illustrates the dimensional change of Example 1 and of Example 12 after mixing up to 48 hours. It can be seen that by adding a calcium aluminate cement (in combination with sodium carbonate and citric acid) as for Example 12, the very early age shrinkage (mainly chemical) can be significantly reduced. This gives a better dimensional stability, which is beneficial. On the other hand, an over-dosage of calcium aluminate cement can lead to expansion, as shown with reference example Ref. 1 and reference example Ref. 2. For the reference example Ref. 3, the dimension change is slightly higher than with Example 2, which is due to the fact that the calcium aluminate cement alone does not contribute to any properties as it acts as inert material.

FIG. 9 illustrates the temperature robustness of the yield stress evolution by comparing tests carried out at 10° C. and at 20° C. It can be seen that with Examples 1 and 12 the yield stress evolution is essentially independent of the temperature. The temperature robustness of the yield stress development is decreased with Example 2, which is due to the absence of the viscosity enhancing admixture Cimsil A55 and of the cellulose fibers Arbocel. Further, the temperature robustness of reference examples Ref. 1 and 2 are also decreased when compared to Example 12, which is due to the absence of the viscosity enhancing admixture Cimsil A55 and of the cellulose fibers Arbocel.

Figure 10:
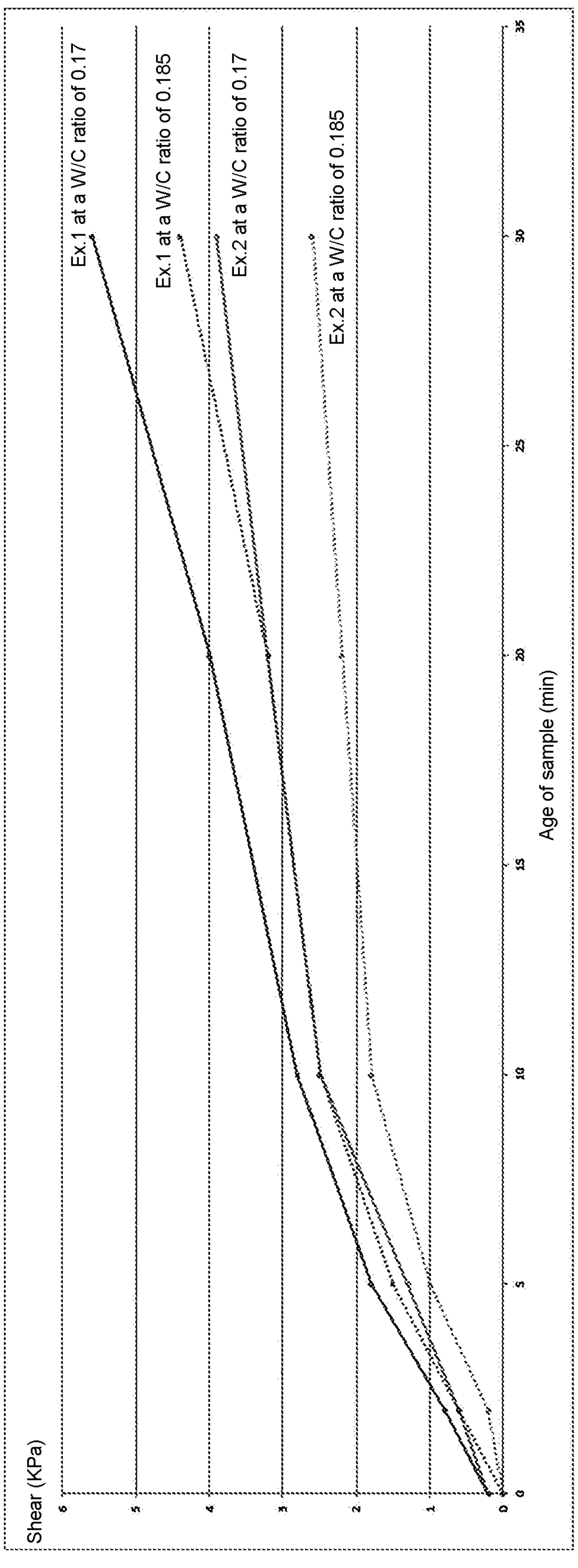

FIG. 10 illustrates the yield stress evolution at different W/C ratios in Examples 1 and 2. The W/C ratio represents the weight ratio of the effective water to the cement present in the dry mix. Example 1 shows a better water robustness compared with Example 2, which is due to the presence of Arbocel (modified cellulose fibers).

EXAMPLE 19

| Component | Amount (grams) |
|---|---|
| CEM I 52, 5R | 275.0 |
| Calcium carbonate 100M | 55.0 |
| AF-T 0/1-C (sand) | 450.0 |
| AF-T 1/2-C (sand) | 200.0 |
| Mecellose 21010 | 0.60 |
| Berolan LP-W1 | 0.10 |
| Cimsil A55 | 3.00 |
| Calcium Formate | 15.00 |
| Arbocel FI 540 CA | 4.00 |
| Citric acid | 0.25 |
| Fibers 6mm | 0.50 |
| Optibent 987 | 3.00 |

EXAMPLE 20

The following example illustrates the effect of different accelerators on yield stress development.

The mixes in the table below are compared to the mix of example 1 (Ex 1), which contains calcium formate (ACC1) as an accelerator.

TABLE 7

| | Composition accelerated with ACC3 | | | Composition accelerated with ACC4 | | |
|---|---|---|---|---|---|---|
| | weight for 1 $m^3$ | wt-% of dry mix | wt-% of cement | weight for 1 $m^3$ | Wt-% of dry mix | wt-% of cement |
| CEM I 52.5R | 559.58 | 30.05 | 100 | 559.58 | 30.07 | 100 |
| Limestone crushed 0/2 | 606.2 | 32.55 | 108.33 | 606.2 | 32.58 | 108.33 |
| Limestone crushed 0/4 | 682.7 | 36.66 | 122 | 682.7 | 36.69 | 122 |
| PUMP-Saint Bonnet 5/10 R | 0 | 0 | 0 | 0 | 0 | 0 |
| SP | 0.671 | 0.04 | 0.12 | 0.671 | 0.04 | 0.12 |
| VEA1 | 1.49 | 0.08 | 0.27 | 1.494 | 0.08 | 0.27 |
| VEA2 | 0 | 0 | 0 | 0 | 0 | 0 |
| Fiber1 | 0 | 0 | 0 | 0 | 0 | 0 |
| Fiber2 | 0.47 | 0.03 | 0.08 | 0.47 | 0.03 | 0.08 |
| ACC1 | 0 | 0 | 0 | 0 | 0 | 0 |
| ACC3 | 11.19 | 0.6 | 2 | 0 | 0 | 0 |
| ACC4 | 0 | 0 | 0 | 9.792 | 0.53 | 1.75 |

The development of yield stress was measured over a duration of 30 minutes, and the results are summarised in table 8 below. The measurement show that calcium formate has a strong positive effect related on the yield stress development, compared to the two inorganic accelerators (calcium chloride and calcium nitrite). In the case of the use of calcium formate, this translates into an increased capacity for the deposited materials to withstand their own weight and to support the weight of additional layers deposited on top.

TABLE 8

| | Yield stress development (kPa) | | | | | |
|---|---|---|---|---|---|---|
| Mixture | 0 min | 2 min | 5 min | 10 min | 20 min | 30 min |
| Ex 1 | 1.5 | 2.0 | 3.0 | 3.5 | 4.6 | 5.8 |
| Composition accelerated with ACC3 | 0.1 | 0.6 | 0.8 | 1.2 | 2 | 2.8 |
| Composition accelerated with ACC4 | 0.2 | 0.6 | 1.2 | 1.3 | 2 | 2.7 |

EXAMPLES 21 AND 22

The following examples describe a high strength monomortar premix, where the super-plasticizing admixture CHRYSO® Optima 100 is pre-diluted in the water. The other admixtures components are all in the dry premix.

In examples 21 and 22, Foxcrete S200, a starch ether viscosity modifier agent provided by Avebe, is used.

The compressive strength of this mixture, measured in 4×4×16, measured according to the protocol described in the standard NF EN 196-1 of September 2016, is of 96.2 MPa.

Although the overall performance of examples 21 and 22 was acceptable, as shown by the overall yield stress development, it was observed here that the viscosity and the flowing behavior of the wet mixture was negatively affected by the mixing step of the premix with water. More specifically, during the mixing and the pumping of the wet mixture, the apparent viscosity decreased, rendering the system less suitable for 3d printing purposes, as the deposited ribbons would be less capable of withstanding their own weight and that of the ribbons deposited immediately on top.

It then appears that the use of Foxcrete S200 is less preferable for the preparation of a premix for 3D printing.

TABLE 9

| | | kg/m$^3$ | wt.-% of dry mix | wt.-% of cement |
|---|---|---|---|---|
| PREMIX 21 | Cement CEM I 52, 5 R - Le Teil plant | 681.80 | 33.9 | 100 |
| | Limestone fine filler (Durcal 1) | 340.90 | 17.0 | 50 |
| | Siliceous micro-sand (0.2-0.6 mm) | 975.38 | 48.5 | 143.06 |
| | Foxcrete S200 (powder) | 0.60 | 0.0 | 0.09 |
| | Calcium formate | 11.59 | 0.6 | 1.70 |
| Added water | Water | 253.99 | 12.6 | 37.25 |
| | CHRYSO ® Optrma 100 (liquide) | 8.98 | 0.4 | 1.32 |

| Yield stress development of Example 21 (kPa) | | | | |
|---|---|---|---|---|
| 2 min | 5 min | 10 min | 20 min | 30 min |
| 0.8 | 1.8 | 2.8 | 4.2 | 6.1 |

TABLE 10

| | | kg/m$^3$ | wt.-% of drymix | wt.-% of cement |
|---|---|---|---|---|
| PREMIX 22 | Cement CEM I 52, 5 R - Le Teil plant | 681.80 | 33.9 | 100 |
| | Limestone fine filler (Durcal 1) | 340.90 | 17.0 | 50 |
| | Siliceous micro-sand (0.2-0.6 mm) | 975.38 | 48.5 | 143.06 |
| | Foxcrete S200 (powder) | 0.60 | 0.0 | 0.09 |
| | Calcium formate | 11.59 | 0.6 | 1.70 |
| Added water | Water | 253.99 | 12.6 | 37.25 |
| | CHRYSO ® Optima 100 (liquide) | 8.98 | 0.4 | 1.32 |

TABLE 11

| Yield stress development of Example 22 (kPa) | | | | |
|---|---|---|---|---|
| 2 min | 5 min | 10 min | 20 min | 30 min |
| 0.8 | 1.8 | 2.8 | 4.2 | 6.1 |

The invention claimed is:

1. A dry cementitious material mixture for 3D-printing, comprising a hydraulic cement, at least one viscosity enhancing admixture, at least one accelerator and aggregates, wherein the at least one viscosity enhancing admixture is present in an amount of 0.05-1.5% by weight based on the hydraulic cement and the at least one accelerator is present in an amount of 0.5-6.0% by weight based on the hydraulic cement, wherein the hydraulic cement comprises Portland cement and an aluminate cement, wherein said aluminate cement is present in an amount of <1.5% by weight based on the total amount of hydraulic cement and wherein upon being added with water, to form a flowable construction material, the flowable construction material has a yield strength of 0.25-8 kPa when being placed.

2. The dry cementitious material mixture according to claim 1, wherein the at least one accelerator comprises calcium formate, calcium chloride and/or calcium nitrite.

3. The dry cementitious material mixture according to claim 1, wherein the at least one accelerator is an organic accelerator.

4. The dry cementitious material mixture according to claim 3, wherein the organic accelerator is calcium formate.

5. The dry cementitious material mixture according to claim 1, wherein the at least one accelerator comprises sodium carbonate.

6. The dry cementitious material mixture according to claim 1, wherein the dry cementitious material mixture further comprises a setting retarder.

7. The dry cementitious material mixture according to claim 1, wherein the at least one viscosity enhancing admixture comprises unmodified polysaccharides or modified polysaccharides, acrylic polymers, and/or an inorganic material.

8. The dry cementitious material mixture according to claim 1, wherein the dry cementitious material mixture further comprises fibers.

9. The dry cementitious material mixture according to claim 1, wherein the dry cementitious material mixture further comprises a superplasticizer.

10. The dry cementitious material mixture according to claim 1, wherein the aggregates consist of particles having a maximum particle size of 16 mm.

11. The dry cementitious material mixture according to claim 10, wherein the aggregates comprise fine aggregates having a maximum particle size of 4 mm, and optionally coarse aggregates having a maximum particle size of 10 mm.

12. The dry cementitious material mixture according to claim 1, wherein the hydraulic cement is present in an amount of 25-45% by weight based on the dry cementitious material mixture.

13. A method of placing a flowable construction material for building structural components layer-by-layer, said method comprising:

providing a dry cementitious material mixture according to claim 1, mixing the dry cementitious material mixture with water to obtain a flowable construction material, conveying the flowable construction material to a deposition head, placing the construction material through an outlet of the deposition head in order to form a layer of construction material, wherein no admixtures are added to the flowable construction material in or at the deposition head.

14. The method according to claim 13, wherein the amount of water mixed with the dry cementitious material mixture is selected to obtain a water/dry cementitious material mixture weight ratio of 0.09-0.23.

15. The method according to claim 13, wherein the flowable construction material has a yield strength of 0.25-8 kPa when being placed.

16. A method comprising providing a dry cementitious material mixture according to claim 1 for 3D-concrete-printing through a deposition head, with no addition of any admixture in or at the deposition head, after having been mixed with water.

17. The dry cementitious material mixture according to claim 1, wherein the at least one viscosity enhancing admixture is present in an amount of 0.2-0.6% by weight based on the hydraulic cement and the at least one accelerator is present in an amount of 1.5-4.0% by weight based on the hydraulic cement.

18. The dry cementitious material mixture according to claim 1, wherein said at least aluminate cement is present in an amount of <1.0% by weight based on the total amount of hydraulic cement.

19. The dry cementitious material mixture according to claim 1, wherein the mixture is free of additional admixtures required to form a flowable construction material upon addition of water.

* * * * *